3,332,899
COATING COMPOSITIONS COMPRISING FATTY OILS AND POLYMER LATICES
Lowell O. Cummings, San Anselmo, John W. Sjoquist, Berkeley, and John A. Kneeland, Menlo Park, Calif., assignors to Pacific Vegetable Oil Corporation, San Francisco, Calif., a corporation of California
No Drawing. Filed Jan. 9, 1963, Ser. No. 250,208
14 Claims. (Cl. 260—23)

This application is a continuation-in-part of application Ser. No. 124,001, filed July 14, 1961, now abandoned.

This invention relates to weather-durable, clear coating compositions for finishing wood. More particularly, this invention relates to clear, water-based oil-latex wood finishes that are highly resistant to cracking, flaking, discoloration, and other undesirable effects upon prolonged exposure to sunlight and weather.

Various synthetic latices, including polyvinyl acetate latex, vinyl acrylic latices, and polyacrylate latices, have been used as clear finishes for wood. However, coatings of these synthetic latices have not adhered well to wood, especially after weathering in sunlight. In fact, they have generally developed cracks along the grain pattern of the wood, apparently due to lack of the proper resiliency of the coating. When the moisture content of the wood has changed, as when the weather has changed from sunny and dry to cloudy and rainy, the wood has expanded and contracted, and since these coatings apparently could not compensate for this change, they cracked.

Conventional oleoresinous solvent-based clear wood films, even of very high quality, have also been prone to checking or cracking, followed by flaking off of bits of the film from the wood. This type of failure is believed to be due to continued oxidation and deterioration resulting from the effects of sunlight and air, causing such films to lose their elasticity and to become brittle, with ultimate loss of adhesion to the wood.

These failings of clear films on wood, with cracking and flaking, have given rise to another serious problem, that of recoating the wood. Before a new coat could be applied, the wood has had to be resurfaced by sanding or scraping, consuming much time, labor, and expense.

Another disadvantage with some of the clear wood finishes, such as unmodified polyvinyl acetate, has been that they have waterspotted whenever moisture has come in contact with them. This spotting has taken the form of a milky haze that develops when the film is wet, and although this haze usually disappears when the film dries, it is very unsightly and undesirable.

One object of this invention is to provide an improved clear finish for wood, in particular redwood, a finish which has better resistance to weathering and other destructive forces than the clear wood finishes heretofore known.

Another object of this invention is to provide a water-based clear finish for wood, and particularly redwood, which has the advantages of both synthetic latex coatings and oleoresinous coatings, without their accompanying disadvantages.

Another object of this invention is to provide a clear coating for wood, and particularly redwood, which will not spot or discolor when exposed to rain or other moisture.

Still another object of this invention is to provide a clear finish for wood, and especially redwood, which can last a long time without cracking, chipping, or flaking off and which thereby normally enables the surface to be recoated without expensive surface preparation.

These and other objects are achieved by emulsifying any of certain oils with a synthetic latex and water. Films formed from this emulsion have a beautiful lustrous or rich satin finish, and a depth which brings out the grain pattern of wood to an exceptional degree. These water-based emulsions are easily and quickly applied with a brush, especially to wood; they can even be applied to damp wood without difficulty or damage. As a water-based composition, these emulsions have the advantage of a very fast initial dry, and successive coats of these finishes can be applied within 15 to 45 minutes of each other. Coatings formed from these water emulsions exhibit much greater durability in sunlight and inclement weather than conventional commercial clear wood coatings. These water-emulsion coatings weather by very slight erosion on their surface, sloughing off a powdery residue which readily washes off in the rain or is blown away by wind to leave a clean, fresh, uncracked, smooth adhering film which is suitable for recoating without preliminary expensive surface preparation.

The oils which can be emulsified with the synthetic latices to produce the outstanding finishes of this invention are the triglycerides of $C_{10}$ to $C_{26}$ fatty acids having an iodine number of at least 100, their pentaerythritol-esterified maleic-acid and fumaric-acid treated derivatives, their polymerized derivatives, and the products resulting from the treatment of tall oil with pentaerythritol. These include: isano oil, tung oil, oiticica oil, linseed oil, malenized linseed oil, fumarized linseed oil, dehydrated castor oil, conjugated safflower oil, non-break safflower oil, malenized safflower oil, fumarized safflower oil, soy oil, malenized (or fumarized) soy oil, esterified tall oil (low rosin type), walnut oil, and menhaden oil. Isano oil is superior in mildew resistance and color retention on redwood, and is preferred where these problems are involved. Isano oil is unique in that it does not benefit from the metal driers commonly used for hardening coating compositions, but instead hardens in the presence of light. In fact, drier-free isano oil-polyvinyl acetate emulsion films are more weather durable than such films containing a drier.

The preferred synthetic latex is a homopolymer of vinyl acetate. However, other synthetic latices may be employed, such as copolymers of vinyl acetate and maleic esters, copolymers of vinyl acetate and fumaric esters, acrylic-styrene copolymers, and butadiene-styrene copolymers.

The oils and the synthetic latices may be combined within the range of about 15 to 75 percent oil to about 85 to 25 percent latex, the percentages being by weight based upon the total weight of the composition. Depending on the climate and other conditions, some ratios will be better than others. For instance, compositions with a very high range of oil content tend to remain tacky until the oil dries by oxidation. Therefore, the most desirable composition will depend on, inter alia, the location at which the coating is to be used, the type of exposure to which it will be subjected, and the time within which the film must dry.

The emulsions of this invention can be prepared by any of several standard procedures. One suitable method is by emulsifying the synthetic latex with water, separately blending the oil with whatever other components are to be included, such as dispersing agents, driers, pigments, etc., and then mixing all components until a suitable emulsion is obtained. Other similar methods of emulsification can be used.

A peculiar feature of the dried films of this invention is that most of them are *not* free from cloudiness, indicating some incompatibility between the homopolymer and the oil, unlike the copolymer oil compositions of U.S. Patent 3,025,253, but we believe that this incompatibility is often an advantage and that the results thereby obtainable are often better than where the oil and polymer are completely compatible. Apparently, the fact that there are, to some extent, two separate phases in the finished film—the hardened vegetable oil interdispersed with synthetic latex particles—gives good weathering properties, by helping to produce the sloughing-off of the eroded oil and latex particles, leaving always a fresh surface. Also, the resiliency of the vegetable oil film helps apparently to impart resistance to cracking and flaking of the film.

To illustrate some of the features of the invention, several water-based emulsions suitable for clear wood finishes are set forth in the following examples. It is understood that these compositions are only representative of the many possible combinations of oils and synthetic latices within the scope of this invention, and thus there is no intention that the invention be limited to these examples.

*Example 1*

A water-based emulsion coating composition is prepared from isano oil and a homopolymer of vinyl acetate as follows. The homopolymer used in this example is 55% (all percentages are by weight) vinyl acetate monomer, 40% water, 4% potassium persulfate solution (5% in water), 0.5% polyethylene glycol ether of nonylphenol, and 0.5% anionic copolymer of methyl vinyl ether and maleic anhydride, polymerized in the usual way.

390 parts by weight of the homopolymer of vinyl acetate (55% non-volatile) and 200 parts by weight of water are mixed. A blend of 10 parts of a 24% lead drier (water dispersible), 5 parts of an alkyl phenyl polyethylene glycol ether dispersing agent, 3.5 parts of a 6% cobalt drier (water dispersible), 3.7 parts of phenyl mercuric acetate (30% solids) is prepared and then emulsified with 200 parts of isano oil, all parts being by weight. This oil emulsion is then mixed with the polyvinyl acetate-water emulsion, and all components are mixed to form a fine, uniform, water-based emulsion containing about 48% oil solids and 52% polyvinyl acetate solids.

*Example 2*

This example is identical to Example 1, except that the driers are omitted. The finished emulsion dries when exposed to light—either direct or indirect sunlight being suitable, and it dries just as well without the driers. It sets up initially to a recoatable film with a slightly waxy feel and becomes very hard and tough when exposed to outdoor light for about a week.

*Example 3*

200 parts by weight of raw tung oil are substituted for the isano oil in the procedure of Example 1, and the resulting emulsion is fine and uniform.

*Example 4*

The procedure of Example 1 is repeated using 200 parts by weight of raw linseed oil in place of the isano oil. This results in a fine, uniform emulsion.

*Example 5*

Substituting 200 parts by weight of conjugated safflower oil (Gardner-Holt viscosity G-H) for the isano oil, the procedure of Example 1 is performed. The result is a fine, uniform emulsion.

*Example 6*

Using 200 parts by weight of dehydrated castor oil (Gardner-Holt viscosity G-H), the Example 1 procedure is performed, and a fine, uniform emulsion results.

*Example 7*

200 parts by weight of non-break safflower oil are substituted for the isano oil of Example 1. A fine, uniform emulsion is formed.

*Example 8*

Each of the emulsions of Examples 1–6 and also (1) an emulsion of the unmodified vinyl acetate homopolymer of Examples 1–7, (2) an emulsion of an unmodified polyvinyl acetate-maleic ester copolymer (polymerized from 44% vinyl acetate monomer, 11% dibutyl maleate, 38.5% water, 5% potassium persulfate five-percent water solution, 1% emulsifier and 0.5% protective colloid), and (3) a solvent-based, commercial redwood clear finish (a tung-linseed phenolic resin plus high polymer linseed oil), are brushed on redwood boards measuring 1″ x 6″ x 36″, one-coat, two-coat, and three-coat layers. These coated boards are then exposed outdoors in Richmond, Calif., facing south at a 45 degree angle. At the end of nine months, each coating is evaluated, and the results are set forth below in Table I.

(The copolymer (2) of the preceding paragraph is polymerized from vinyl acetate monomer and dibutyl maleate monomer (a very similar copolymer is identical except that dibutyl fumarate is the other monomer). The copolymer is, by weight, 44% vinyl acetate monomer, 11% dibutyl maleate, 38.5% water, 5% potassium persulfate catalyst (5% aqueous solution), 1% emulsifier (polyethylene glycol ether of nonylphenol), and 0.5% protective colloid (anionic copolymer of methyl vinyl ether and maleic anhydride). The anionic copolymer and emulsifier are added to the water with agitation, the pH being adjusted to 7.0 by adding NaOH. About 5% of the monomer blend is added, and the mixture is heated to about 68–72° C. Half of the catalyst is added. Then the remainder of the monomer blend is added slowly, along with the remainder of the catalyst. Then the mixture is held at 90° C. for about 30 minutes, resulting in the copolymer. This is the conventional way to make this type of polymer, and the homopolymer of Examples 1–6 is made in substantially the same manner.)

TABLE I

| Coating Composition | Appearance of Film, 3 coats | Rating [1] |
|---|---|---|
| Examples 1 and 2 | No cracking; clean, smooth surface; good redwood color. Example 2 slightly better. | 9 |
| Example 3 | No cracking; clean, smooth surface; good redwood color. | 7 |
| Example 4 | -----do----- | 7 |
| Example 5 | -----do----- | 6 |
| Example 6 | -----do----- | 6 |
| Example 7 | -----do----- | 5 |
| Unmodified PVA Homopolymer Emulsion (1). | Severe cracking and chipping | 0 |
| Unmodified PVA, Maleate Emulsion (2). | -----do----- | 0 |
| Tung-linseed phenolic resin plus high polymer linseed oil (3). | Severe cracking and flaking | 0 |

[1] 10=Perfect. 0=Failure.

Since there is a high amount of sunlight at this California location during the nine month period, the test is considered very severe for a clear wood finish. No wood discoloration is observed on the boards coated with the emulsions of Examples 1–7, whereas an uncoated control board darkens considerably. Furthermore, the coatings of both of the unmodified polyvinyl acetate emulsions spot heavily during the rainy season. In contrast, the coatings formed from the emulsions of Examples 1–6 show very little if any spotting tendency.

*Example 9*

Oiticica oil is substituted, in equal amount, for the tung oil of Example 3, with results nearly but not quite so good.

*Example 10*

Here, the latex is an acrylate-methacrylate copolymer, having 200 parts (by weight) of ethyl acrylate, 200 parts of methyl methacrylate, 536 parts of deionized water, 0.8 part of ammonium persulfate, and 13.5 parts of alkaryl ether sulfonate.

To 425 parts by weight of this acrylate-methacrylate copolymer 400 parts of an isano-oil emulsion are added. (This emulsion is made from 196 parts of isano oil, 32 parts of a 5% solution of hydroxy ethyl cellulose, 8 parts of nonyl phenyl polyethylene glycol, and 164 parts of water.) To these are added 10 parts of a water-dispersible, 24% lead drier, 3.5 parts of water-dispersible of 6% cobalt drier, and 3.7 parts of a 30% solution of phenyl mercuric acetate.

The mixture is applied by a brush to some wood test panels. After 18 months' exposure at 45° South in Richmond, Calif., the coatings still show no cracking.

Example 11

Example 10 is repeated, omitting the lead and cobalt driers and getting even better results.

Example 12

Example 10 is duplicated except for the substitution of linseed oil for the isano oil. This, likewise, shows good exposure results.

Example 13

A vinyl acetate-acrylic copolymer is made from 44% vinyl acetate monomer, 11% ethyl acrylate, 40% water, 0.5% anionic copolymer of methyl vinyl ether and maleic anhydride, and 0.5% polyethylene oxide ether of nonylphenol.

To 367 parts of this vinyl acetate-acrylic copolymer, 400 parts of a linseed-oil emulsion are added, made as in Example 12, and the same driers and other chemicals as Example 12 (stated in Example 10) are also added.

Again, the coating gives excellent results.

Example 14

The same compounding as in Examples 12 and 13 is made except that the polymer is 425 parts of an interpolymer latex of about 45% styrene, 40% 2-ethyl hexylacrylate, 12% acrylonitrile, and 3% methacrylic acid. Again, excellent results are obtained from the finished coating.

Example 15

To overcome the problem of mildew, zinc borate may be incorporated into the coating of this invention, the zinc borate being almost invisible in the coating.

A slurry of zinc borate is made from 40 parts (by weight) of zinc borate, 40 parts of tap water and 6 parts of wetting agents. The 86 parts of zinc borate mix are added to 800 parts of the linseed oil emulsion of Example 12, 734 parts of the vinyl acetate homopolymer latex of Example 1, 20 parts of water-dispersible 24%-lead drier, 7 parts of water-dispersible 6% cobalt drier, and 7.4 parts of a 30% solution of phenyl mercuric acetate.

The coating was painted on wood test panels and exposed as before. Not only was it excellent in performance, but it also reduced the formation of mildew substantially.

Example 16

Linseed oil is malenized, according to this invention, to $Z_3$ viscosity by treating 905 parts of linseed oil with 42.5 parts of pentaerythritol and 0.01 part of hydrated lime and then with 53 parts of maleic anhydride, heat being used as needed.

196 parts (by weight as throughout this specification) of this malenized linseed oil are mixed with 23 parts of a 5% solution of hydroxyethyl cellulose and 8 parts of nonylphenol polyethylene glycol. To this is added 164 parts of water, stirring rapidly until a smooth emulsion is obtained.

Four hundred parts of this smooth emulsion are mixed with 364 parts of vinyl acetate-acrylic latex of Example 13, making approximately equal weights of the non-volatile drying oil and the non-volatile polymer. Then 10 parts of water-dispersible 24%-lead drier is added along with 3.5 parts of a water dispersible 6%-cobalt drier and 3.7 parts of a 30% solution of phenyl mercuric acetate. These are stirred in, completing the composition.

Example 17

Safflower oil is malenized to a $Z_3$ viscosity as was the linseed oil of Example 16, using 949.5 parts of non-break safflower oil, 25.5 parts of dipentaerythritol, 0.01 part of hydrated lime, and 28.0 parts of maleic anhydride.

An emulsion is made as in Example 16, substituting the same amount of the malenized safflower oil for malenized linseed oil.

Four hundred parts of this emulsion are mixed with 425 parts of the interpolymer of styrene, 2-ethyl hexacrylate, acrylonitrile, and methacrylic acid, as in Example 14. The drying agents etc. are added as in Example 16.

Example 18

Soy oil is malenized to a $Z_3$ viscosity by substituting equal parts of soy oil for the safflower oil of Example 17. Four hundred parts of the emulsion, made as in Example 16 with the substitution of the malenized soy oil for the malenized linseed oil, are added to 364 parts of the vinyl acetate homopolymer latex of Example 1. Drying agents are added as in Example 16.

Example 19

Non-break soy oil is substituted for the malenized soy oil in the emulsion of Example 18. 400 parts of this emulsion are added to 364 parts of the vinyl acetate copolymer with dibutyl maleate of Example 8.

Example 20

88.5 parts of tall oil fatty acids of rosin content below 2% are treated at 500° F. with 11.5 parts of pentaerythritol until the acid number drops below 10 and treatment continues at this or a higher temperature until a $Z_3$ viscosity is reached. An emulsion is made as in Example 16 by substituting these esterified tall oil fatty acids for the malenized linseed oil. 400 parts of the emulsion are added to 364 parts of a vinyl acetate copolymer with dibutyl fumarate (made as the maleate copolymer in Example 8 except for the use of the fumarate instead of the maleate). Drying agents are added as before.

Example 21

An emulsion is made as in Example 16 using walnut oil in place of malenized linseed oil. 400 parts of the emulsion are added to a styrene-butadiene polymer. (The polymer is made by reacting 29.3 parts of styrene, 15.8 parts of butadiene, 0.3 part of sodium carbonate, 0.6 part of potassium persulfate, 2.0 parts of sodium dodecyldiphenyl ether disulfonate, 2.0 parts of dihexyl ester of sodium succinic acid, and 50 parts of deionized water. After stirring at about 60° C. for 16 hours, the resulting polymer emulsion is steam-distilled to remove any remaining monomer and adjusted to an alkaline pH with potassium hydroxide.) The oil-latex emulsion has drying agents added as in Example 16.

Example 22

Menhaden oil is substituted for the malenized linseed oil of Example 16, and 400 parts of the resulting emulsion are mixed with 364 parts of the vinyl acetate homopolymer latex of Example 1. The drying oils etc. are added as in Example 16.

Example 23

The use of a bodied oil and an emulsion having a minimum amount of water are herein illustrated. An emulsion is made of 19.5 parts of heat-bodied conjugated safflower oil, G viscosity, 45.5 parts of heat-bodied conjugated safflower oil, $Z_8$ viscosity, 3.8 parts of polyethylene glycol ether of nonyl phenol, and 31.2 parts of water.

308 parts of this emulsion (65% oil content) are mixed with 364 parts of the vinyl acetate homopolymer latex of Example 1 (55% solids). 10 parts of 24%-lead drier, 3.5 parts of water-dispersible 6%-cobalt drier, and 3.7 parts of phenyl mercuric acetate, 30% solids, are added. The mixture contains about 60% solids in about 40% water.

*Example 24*

462 parts of the oil emulsion of Example 23 are combined with 182 parts of vinyl-acrylic latex, 55% solids, of Example 13. To this are added 15 parts of water-dispersible 24%-lead drier, 5 parts of water-dispersible 6%-cobalt drier, and 6 parts of 30% phenyl mercuric acetate solution, giving a solids content of about 75% oil and about 25% polymer. The total non-volatile content is about 62%, and the water content is about 38%. Up to 65% of non-volatile content can be obtained.

*Example 25*

154 parts of the oil emulsion of Example 23 are combined with 545 parts of the latex of Example 24. The same driers are added in 5, 2, and 7 parts respectively. This gives a solids content of about 25% oil and 75% polymer, and a total non-volatile content of about 56% and a water content of 44%.

*Example 26*

The emulsion of Example 24 is diluted with water, by diluting 100 parts of the finished material of Example 24 with 1140 parts of water, giving a thin watery emulsion still leaving a thin film of oil-synthetic latex coating when the water dries. This is about 5% solids and 95% water and is about as thin as will give a satisfactory film on wood. It can be thinned further if desired, but the film will then be pretty thin.

*Example 27*

Safflower oil treated as in Example 17 except that 34 parts of fumaric acid are substituted for the 28 parts of maleic anhydride. The product is made as in Example 17 and appears to be identical thereto. Fumaric acid can be used in place of maleic acid in any of the examples, if desired.

All of the materials of Examples 16 to 27 give satisfactory coatings on wood, some better than others, but all of good quality.

*Example 28*

The clear coating composition of this invention may, of course, be pigmented. For example 367 parts by weight of the homopolymer of Example 1 may be mixed with 400 parts of linseed oil emulsion (196 parts of linseed oil, 32 parts of 5% aqueous solution of ethyl cellulose, 3 parts of nonyl phenyl polyethylene glycol, and 164 parts of water), 10 parts of water-dispersible 24%-lead drier, 3.5 parts of water-dispersible 6%-cobalt drier, 3.7 parts of a 30% aqueous solution of phenyl mercuric acetate, and 5 parts of universal red oxide tint (a slurry of 65% iron oxide in wetting agents). The resulting film shows even better resistance to weathering in sunlight than the same coating unpigmented.

*Example 29*

Example 28 is repeated, substituting isano oil for linseed oil, omitting the driers, and using 10 parts by weight of burnt sienna slurry in place of the red oxide slurry. Again, the results obtained from the finished stained clear film are even better than when the pigment is omitted, though that, too, gives excellent results.

To those skilled in the art to which this invention relates, many changes in composition and widely differing embodiments and applications of the invention will suggest themselves without departing from the spirit and scope of the invention. The disclosures and the description herein are purely illustrative and are not intended to be in any sense limiting.

We claim:
1. A clear coating composition comprising an emulsion of
   (1) water
   (2) an oil having an iodine number of at least 100 and chosen from the group consisting of
      (a) the triglycerides of $C_{10}$ to $C_{26}$ fatty acids,
      (b) the maleic-acid treated pentaerythritol-modified triglycerides of (a) with an acid-to-glyceride ratio no greater than about 7%,
      (c) the fumaric-acid treated, pentaerythritol-modified triglycerides of (a) with an acid-to-glyceride ratio no greater than about 7%,
      (d) the polymerized derivatives of (a), and
      (e) bodied tall oil fatty acid esters of aliphatic polyols, and
   (3) a synthetic latex of a material chosen from the group consisting of
      (f) vinyl acetate homopolymer, about 55% solids,
      (g) the copolymers of vinyl acetate and aliphatic alcohol esters of maleic acid, the alcohol containing from one to ten carbon atoms, about 55% solids
      (h) the copolymers of vinyl acetate and aliphatic alcohol esters of fumaric acid, the alcohol having from one to ten carbon atoms, about 55% solids
      (i) the homopolymers of acrylic and methacrylic acids and their copolymers with each other, about 47% solids
      (j) the copolymers of vinyl acetate and the acrylic and methacrylic esters of alcohols having one to ten carbon atoms, about 55% solids
      (k) the copolymers of styrene, acrylonitrile, 2-ethyl hexyl acrylate, and methacrylic acid, about 47% solids
      (l) the butadiene-styrene resins, about 47% solids
   the relative proportions of oil and latex being from 25% to 75% oil and 75% to 25% latex.
2. The coating composition of claim 1 having a solids content of between 5% and 65%, by weight of the total composition, as measured upon drying, the remainder being water and other volatiles.
3. The coating composition of claim 1 having an addition pigment in an amount no greater than 1% by weight of the total weight of the oil and latex solids.
4. A clear coating composition comprising a water emulsion containing 5% to 65% of solids comprising
   (1) 25% to 75% of oil chosen from the group consisting of
      (a) isano, tung, oiticica, linseed, dehydrated castor, safflower, soy, walnut, and menhaden oils,
      (b) the maleic-acid treated pentaerythritol-modified oils of (a) with an acid-to-oil ratio no greater than about 7%,
      (c) the fumaric-acid treated, pentaerythritol-modified oils of (a) with an acid-to-oil ratio no greater about 7%,
      (d) the polymerized derivatives of (a), and
      (e) bodied tall oil fatty acid esters of aliphatic polyols, and
   (2) 75% to 25% of synthetic latex solids of a material chosen from the group consisting of
      (f) vinyl acetate homopolymer,
      (g) the copolymers of vinyl acetate and aliphatic alcohol esters of maleic acid, the alcohol containing from one to ten carbon atoms,
      (h) the copolymers of vinyl acetate and aliphatic alcohol esters of fumaric acid, the alcohol having from one to ten carbon atoms,
      (i) the homopolymers of acrylic and methacrylic acids and their copolymers with each other,

(j) the copolymers of vinyl acetate and the acrylic and methacrylic esters of alcohols having one to ten carbon atoms (k) the copolymers of styrene, acrylonitrile, 2-ethyl hexyl acrylate, and methacrylic acid, and (l) the butadiene-styrene resins.

5. The composition of claim 4 containing a maximum amount by weight of pigment of 1% of the total weight of the oil and latex solids.

6. A clear coating composition comprising an emulsion of (1) water (2) an oil chosen from the group consisting of
 (a) isano, tung, oiticica, linseed, dehydrated castor, safflower, soy, walnut, and menhaden oils,
 (b) the maleic-acid treated pentaerythritol-modified oils of (a) with an acid-to-oil ratio no greater than about 7%,
 (c) the fumaric-acid treated, pentaerythritol-modified oils of (a) with an acid-to-oil ratio no greater than about 7%,
 (d) the polymerized derivatives of (a), and
 (e) bodied tall oil fatty acid esters of aliphatic polyols, and (3) a synthetic latex, about 45% to 55% solids, of a material chosen from the group consisting of
 (f) vinyl acetate homopolymer
 (g) the copolymers of vinyl acetate and aliphatic alcohol esters of maleic acid, the alcohol containing from one to ten carbon atoms
 (h) the copolymers of vinyl acetate and aliphatic alcohol esters of fumaric acid, the alcohol having from one to ten carbon atoms
 (i) the homopolymers of acrylic and methacrylic acids and their copolymers with each other
 (j) the copolymers of vinyl acetate and the acrylic and methacrylic esters of alcohols having one to ten carbon atoms
 (k) the copolymers of styrene, acrylonitrile, 2-ethyl hexyl acrylate, and methacrylic acid
 (l) the butadiene-styrene resins, the relative proportions of oil and latex being from 25% to 75% oil and 75% to 25% latex, the coating composition having a solids content of between 5% and 65%, by weight of the total composition, as measured upon drying, the remainder being water and other volatiles.

7. The composition of claim 6 wherein the latex is vinyl acetate homopolymer.

8. The composition of claim 6 wherein the oil is conjugated safflower oil.

9. A clear coating composition comprising an emulsion of (1) water (2) an oil having an iodine number of at least 100 and chosen from the group consisting of
 (a) the triglycerides of $C_{10}$ to $C_{26}$ fatty acids,
 (b) the maleic-acid treated pentaerythritol-modified triglycerides of (a) with an acid-to-triglyceride ratio no greater than about 7%,
 (c) the fumaric-acid treated, pentaerythritol-modified triglycerides of (a) with an acid-to-triglyceride ratio no greater than about 7%,
 (d) the polymerized derivatives of (a), and
 (e) bodied tall oil fatty acid esters of aliphatic polyols, and (3) a synthetic latex of about 45% to 55% solids of a material chosen from the group consisting of
 (f) vinyl acetate homopolymer
 (g) the copolymers of vinyl acetate and aliphatic alcohol esters of maleic acid, the alcohol containing from one to ten carbon atoms
 (h) the copolymers of vinyl acetate and aliphatic alcohol esters of fumaric acid, the alcohol having from one to ten carbon atoms
 (i) the homopolymers of acrylic and methacrylic acids and their copolymers with each other
 (j) the copolymers of vinyl acetate and the acrylic and methacrylic esters of alcohols having one to ten carbon atoms
 (k) the copolymers of styrene, acrylonitrile, 2-ethyl hexyl acrylate, and methacrylic acid
 (l) the butadiene-styrene resins the total solids content of between 5% and 65%, by weight of the total composition, the water content being from 95% to 65%, by weight, the oil to latex ratio being from 1:3 to 3:1.

10. A clear, weather durable coating composition comprising an emulsion of 35% to 95% water, the remainder consisting essentially of vinyl acetate homopolymer, and isano oil, the oil to homopolymer ratio being from 1:3 to 3:1.

11. A clear, weather durable coating composition comprising an emulsion of 35% to 95% water, the remainder consisting essentially of vinyl acetate homopolymer, and tung oil, the oil to homopolymer ratio being from 1:3 to 3:1.

12. A clear, weather durable coating composition comprising an emulsion of 35% to 95% water, the remainder consisting essentially of vinyl acetate homopolymer, and linseed oil, the oil to homopolymer ratio being from 1:3 to 3:1.

13. A clear, weather durable coating composition comprising an emulsion of 35% to 95% water, the remainder consisting essentially of vinyl acetate homopolymer, and conjugated safflower oil, the oil to homopolymer ratio being 1:3 to 3:1.

14. A clear, weather durable coating composition comprising an emulsion of 35% to 95% water, the remainder consisting essentially of vinyl acetate homopolymer, and dehydrated castor oil, the oil to homopolymer ratio being 1:3 to 3:1.

References Cited

UNITED STATES PATENTS

| | | | |
|---|---|---|---|
| 2,683,700 | 7/1954 | Gehring | 260—23.7 |
| 2,820,711 | 1/1958 | Kiebler et al. | 106—34 |
| 2,889,236 | 6/1959 | Hahn | 260—23 |
| 2,976,163 | 3/1961 | Bitting et al. | 260—23 |
| 3,025,253 | 3/1962 | Mayne et al. | 260—23 |
| 3,033,808 | 5/1962 | Murray et al. | 260—23 |
| 3,051,671 | 8/1962 | Cummings | 260—18 |
| 3,234,039 | 2/1966 | Lalk et al. | 117—72 |
| 3,251,790 | 5/1966 | Christenson et al. | 260—23 |

OTHER REFERENCES

Kirk et al.: "Encyclopedia of Chemical Technology," (1950), vol. 5, pp. 277–297.

Kneeland et al.: Journal of the American Oil Chemists' Society (1958), vol. 35, pp. 361–363.

DONALD E. CZAJA, *Primary Examiner.*

R. A. WHITE, *Assistant Examiner.*

UNITED STATES PATENT OFFICE
CERTIFICATE OF CORRECTION

Patent No. 3,332,899        July 25, 1967

Lowell O. Cummings et al.

It is hereby certified that error appears in the above numbered patent requiring correction and that the said Letters Patent should read as corrected below.

Column 7, line 40, after "oil" insert -- is --; line 54, before "ethyl" insert -- hydroxy --; column 8, lines 31 and 75, column 9, line 36, and column 10, line 11, for "acids", each occurrence, read -- esters --; column 8, line 46, for "an" read -- in --; line 61, for "greater" read -- greater than --.

Signed and sealed this 30th day of July 1968.

(SEAL)
Attest:

Edward M. Fletcher, Jr.       EDWARD J. BRENNER
Attesting Officer         Commissioner of Patents